United States Patent [19]

Hsu

[11] Patent Number: 5,446,279

[45] Date of Patent: Aug. 29, 1995

[54] FIBER OPTIC SENSOR SENSING CURVATURE OF A DIAPHRAGM

[75] Inventor: Tsung-Yuan Hsu, Westlake Village, Calif.

[73] Assignee: Hughes Aircraft Company, Los Angeles, Calif.

[21] Appl. No.: 113,537

[22] Filed: Aug. 27, 1993

[51] Int. Cl.[6] ............................ G02B 6/26; H01J 5/16
[52] U.S. Cl. ..................... 250/227.21; 250/231.19; 385/12; 73/705
[58] Field of Search ............... 250/227.14, 227.21, 250/227.28, 231.19; 385/12, 15, 47; 73/705, 715, 723; 364/571.01

[56] References Cited

U.S. PATENT DOCUMENTS

| | | | |
|---|---|---|---|
| 3,327,584 | 6/1967 | Kissinger | 250/227.28 |
| 3,580,082 | 5/1971 | Strack | 385/12 |
| 3,792,928 | 2/1974 | Poilleux | 385/12 |
| 4,158,310 | 6/1979 | Ho | 73/705 |
| 4,210,029 | 7/1980 | Porter | 73/705 |
| 4,249,076 | 2/1981 | Bergstrom et al. | 250/227.14 |
| 4,322,978 | 4/1982 | Fromm | 250/231.19 |
| 4,322,979 | 4/1982 | Fromm | 73/705 |
| 4,521,683 | 6/1985 | Miller | 250/231.1 |
| 4,547,668 | 10/1985 | Tsikos | 73/705 |
| 4,588,886 | 5/1986 | Snider | 73/705 |
| 4,589,286 | 5/1986 | Berthold, III | 73/705 |
| 4,620,093 | 10/1986 | Barkhoudarian et al. | 73/705 |
| 4,687,927 | 8/1987 | Iwamoto et al. | 73/705 |
| 4,781,059 | 11/1988 | Suzuki et al. | 73/705 |
| 4,799,751 | 1/1989 | Tekippe | 385/12 |
| 4,805,630 | 2/1989 | Storey | 73/705 |
| 5,036,194 | 7/1991 | Hazel | 250/227.21 |
| 5,038,031 | 8/1991 | Kurosawa et al. | 250/227.28 |
| 5,127,269 | 7/1992 | Grudzien, Jr. | 73/705 |
| 5,138,155 | 8/1992 | Gray | 73/705 |
| 5,200,610 | 4/1993 | Zuckerwar et al. | 250/227.21 |
| 5,275,053 | 1/1994 | Wlodarczyk et al. | 73/705 |
| 5,279,793 | 1/1994 | Glass | 385/12 |

OTHER PUBLICATIONS

IBM Tech. Discl. Bull., "Compensation Scheme for Differential Fiber Reflectometer", pp. 394–395, vol. 28 No. 1 Jun. 1985.

"Fiber-Optic Diaphragm-Curvature Pressure Transducer" Optic Letters, vol. 8 No. 5, 5, 83, Lawson et al. pp. 286–288.

Final Report entitled "Fiber Optic Pressure Transducer", dated Jun. 19, 1984, T. Y. Hsu, prepared for the Department of the Navy, Naval Sea Systems Command, Washington, D.C., under Contract No. N00024-83-C-4271.

Primary Examiner—Stephone B. Allen
Attorney, Agent, or Firm—V. D. Duraiswamy; W. K. Denson-Low

[57] ABSTRACT

A first surface of a diaphragm is exposed to high temperature gas in the combustion chamber of an internal combustion engine. The curvature of the diaphragm changes in response to the gas pressure. Three optical fibers are spaced along a radius of the diaphragm and have ends which face a second surface of the diaphragm. A light source injects light into a center fiber, which is displaced from the center of the diaphragm by a predetermined distance. Outer fibers receive light from the center fiber after reflection from the diaphragm. The relative intensities of light reflected from the diaphragm into the outer fibers correspond to the curvature of the diaphragm and thereby to the pressure. The outer fibers have a larger numerical aperture than the center fiber, and the light source fully populates all of the optical modes of the center fiber to reduce modal noise caused by physical perturbation of the fibers. The fibers preferably have a square cross-section to maximize linearity. Structure is provided to inhibit thermally induced curvature of the diaphragm. A computer computes the pressure in response to the relative reflected light intensities. A temperature sensor provides an input to the computer which enables compensation for variation of the sensitivity of the diaphragm with temperature.

32 Claims, 7 Drawing Sheets

FIBER OPTIC SENSOR SENSING CURVATURE OF A DIAPHRAGM

BACKGROUND OF THE INVENTION

1. Field of the Invention

The present invention generally relates to the art of optoelectronic sensing, and more specifically to an improved fiber optic sensor for sensing the pressure in a high temperature, high pressure environment such as the combustion chamber of an internal combustion engine.

2. Description of the Related Art

U.S. Pat. No. 4,799,751, entitled "DETECTION DEVICE USING FIBER OPTIC TECHNIQUES" issued Jan. 24, 1989 to V Tekippe, discloses a pressure sensor such as illustrated in FIGS. 1a to 1c and 2 and designated as 10. The sensor 10 includes a flexible disc or diaphragm 12 having an upper first surface 12a which is exposed to a pressure to be sensed.

Figure 1A:
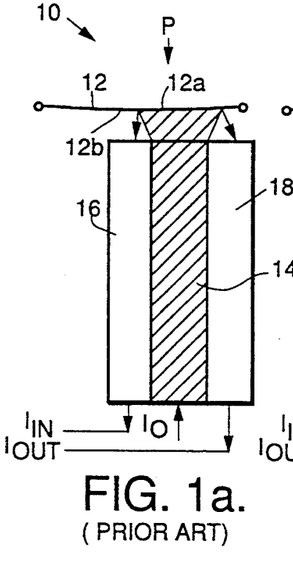
FIGS. 1a, 1b and 1c are diagrams illustrating a prior art pressure sensor to which the present invention constitutes an improvement.
Figure 1B:
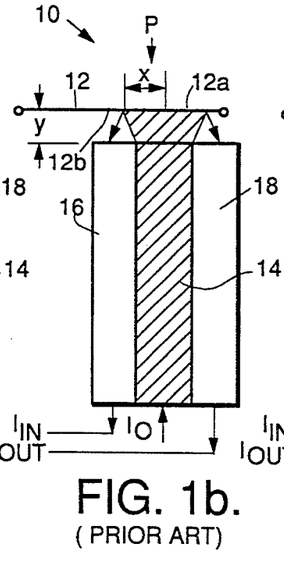
Figure 1C:
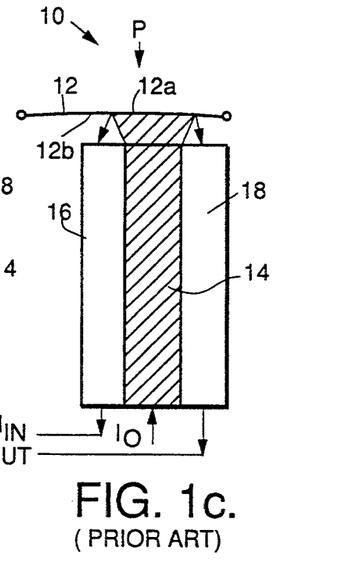

Light is injected into the lower end of a first or center optical fiber 14 as indicated by an intensity $I_0$, and propagates upwardly through and is projected by the fiber 14 onto the second surface 12b of the diaphragm 12. The light path through fiber 14 to the diaphragm is indicated by hatching. Second and third outer optical fibers 16 and 18 are spaced on the opposite sides of the fiber 14. The fibers 14, 16 and 18 are parallel, at least at their upper end portions which are adjacent to the diaphragm 12.

Light which emerges from the upper end of the fiber 14 is reflected from the surface 12b and enters the upper ends of the fibers 16 and 18 as indicated by downward directed arrows. The reflected light propagating through the fibers 16 and 18 is designated as intensities $I_{IN}$ and $I_{OUT}$ respectively.

The center of the inner fiber 14 is spaced from the center of the diaphragm 12 by a distance x. The fiber 16 is radially inward of the fibers 14 and 18. Preferably, $x = r/3^{\frac{1}{2}}$ where r is the radius of the diaphragm 12. At this point the radial slope of the diaphragm 12 exhibits a maximum and provides the sensor 10 with maximum sensitivity. The upper ends of the fibers 14, 16 and 18 are spaced from the surface 12b of the diaphragm 12 by a distance y and are perpendicular to the diaphragm 12 when the diaphragm 12 is flat.

FIG. 1b illustrates the case in which the pressure P which is applied to the surface 12a of the diaphragm 12 is zero, and the diaphragm 12 is flat. The upper ends of the fibers 14, 16 and 18 are all spaced from the diaphragm 12 by the distance y, and the same amount of light is reflected from the surface 12b of the diaphragm 12 into both fibers 16 and 18 such that $I_{IN} = I_{OUT}$.

FIG. 1a illustrates the pressure P as being greater than zero. The diaphragm 12 is curved by the applied pressure such that the surface 12b which faces the fibers 14, 16 and 18 is convex. Since the fibers 14, 16 and 18 are offset from the center of the diaphragm 12, more light is reflected from the surface 12b into the fiber 18 than into the fiber 16. In this case $I_{IN} < I_{OUT}$.

When the pressure P is less than zero as illustrated in FIG. 1c, the surface. 12b of the diaphragm 12 which faces the fibers 14, 16 and 18 is concave, and more light is reflected from the surface 12b into the fiber 16 than into the fiber 18, such that $I_{IN} > I_{OUT}$. In this manner, the sensor 10 is capable of sensing both the magnitude and sign (positive or negative) of the pressure P.

Figure 2:
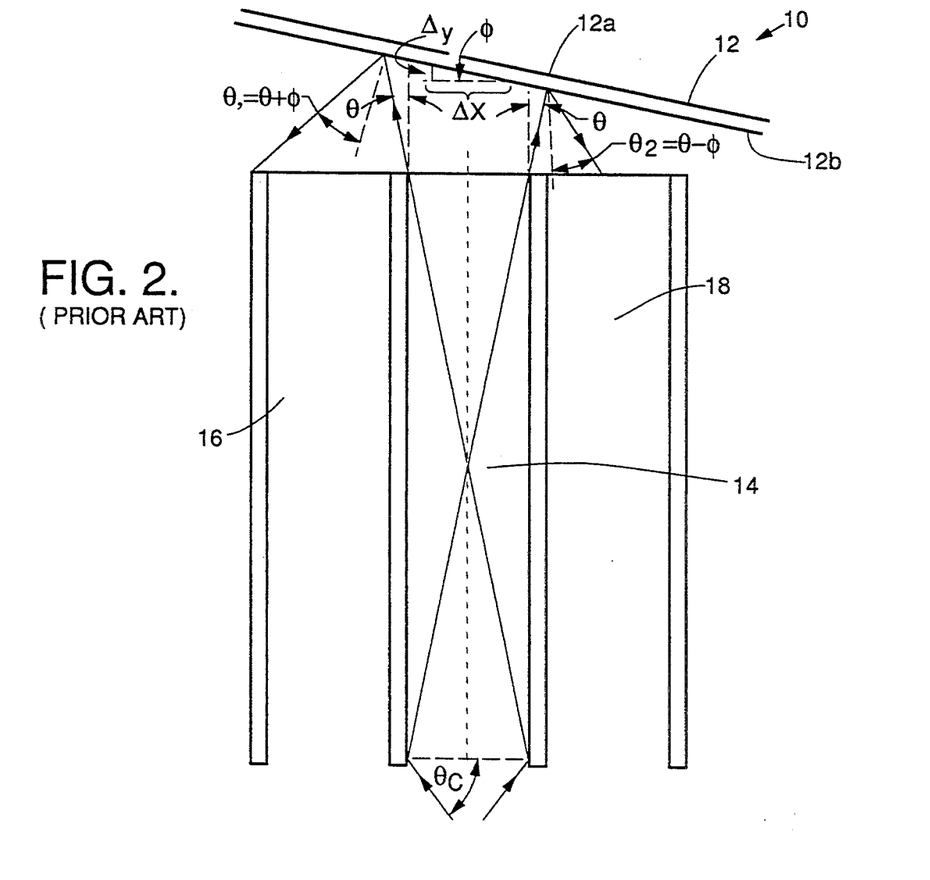
FIG. 2 is a diagram illustrating the geometry of the sensor of FIGS. 1a, 1b and 1c to enlarged scale.

The geometry of the sensor 10 for the exemplary case of negative pressure P is illustrated in FIG. 2. As disclosed by Tekippe, the fibers 14, 16 and 18 are identical, having the same diameter, index of refraction and numerical aperture. Assuming that the index of refraction of the cores of the fibers 14, 16 and 18 is $n_1$ and the index of refraction of the cladding of the fibers 14, 16 and 18 is $n_2$, the critical angle $\theta_c$, below which total internal reflection will occur in the fibers 14, 16 and 18, is $\theta_c = \sin^{-1}(n_2/n_1)$.

The slope of the diaphragm 12 at the center of the light beam incident on the surface 12b from the center fiber 14 is $\Delta y/\Delta X$, and the curvature of the diaphragm 12 can be expressed as an angle of inclination $\phi = \tan^{-1}(\Delta y/\Delta X)$. Light emerging from the fiber 14 at the critical angle $\theta_c$ is refracted in the air gap between the fibers 14, 16 and 18 and the diaphragm 12 and is incident on the surface 12b of the diaphragm 12 at an angle $\theta$.

Due to the curvature of the diaphragm 12, this light is reflected from the surface 12b of the diaphragm 12 into the upper end of the fiber 16 at an angle $\theta_1 = \theta + \phi$, and light is reflected into the upper end of the fiber 18 at an angle $\theta_1 = \theta - \phi$.

Assuming that the diameter of the diaphragm 12 is much larger than the diameter of the fiber 14, the pressure P can be expressed as the ratio of the sum and difference of the intensities $I_{IN}$ and $I_{OUT}$ as $(I_{OUT} - I_{IN})/(I_{OUT} + I_{IN}) = 2AP$. Solving for P produces $P = (\frac{1}{2}A)[(I_{OUT} - I_{IN})/(I_{OUT} + I_{IN})]$. For low temperature applications, A is substantially constant.

The sensed pressure P is therefore independent of the diameter of the fibers 14, 16 and 18, the distance y between the fibers 14, 16 and 18 and the diaphragm 12, the reflectance of the diaphragm 12, the intensity of the input light $I_0$, and is therefore insensitive to environmental perturbations.

The prior art arrangement of Tekippe is subject to substantial optical signal noise caused by physical perturbation or bending of the fibers 14, 16 and 18. Bending of the fibers 14, 16 and 18 causes changes in the optical mode distribution of the light propagating therethrough, which in turn affects the intensities $I_{IN}$ and $I_{OUT}$ and thereby the value of P.

Accurate sensing of the pressure in the combustion chamber of an internal combustion engine enables advantageous feedback control of spark advance, cylinder dilution, individual cylinder fuel rate and other parameters using pressure ratio management algorithms. At high temperatures on the order of 700° C., such as encountered in this type of application, the value of A varies significantly with temperature.

More specifically, A is a function of the Young's modulus and Poisson's ratio of the diaphragm 12, both of which are temperature dependent. This causes the sensitivity of the diaphragm 12 to vary with temperature, and produce inaccuracy in the sensed value of pressure P.

A diaphragm 12 consisting of a simple disc as disclosed by Tekippe is subject to temperature induced curvature which also varies with temperature. The curvature of such a diaphragm 12 will change as the temperature increases or decreases, even if there is no change in pressure P. These effects cause zero drift in the pressure reading, and limit the attainable accuracy of the sensor 10 in a high temperature environment.

SUMMARY OF THE INVENTION

In a high temperature pressure sensor embodying the present invention, a first surface of a diaphragm is exposed to high temperature gas in the combustion chamber of an internal combustion engine. The curvature of the diaphragm changes in response to the gas pressure.

One center and two outer optical fibers are spaced along a radius of the diaphragm and have ends which face a second surface thereof. A light source injects light into the center fiber, which is displaced from the center of the diaphragm by a predetermined distance. The two outer fibers receive light from the center fiber after reflection from the diaphragm.

The relative intensities of reflected light correspond to the curvature of the diaphragm and thereby to the pressure. The outer fibers have a larger numerical aperture than the center fiber, and the light source fully populates all of the optical modes of the center fiber to increase the optical coupling coefficient and reduce noise caused by physical perturbation of the fibers, such as vibration from an engine or bending during installation. The fibers preferably have a square cross-section to maximize linearity and dynamic range.

Structure is provided to inhibit thermally induced curvature of the diaphragm. In one embodiment of the invention, a diaphragm holder which clamps the peripheral edge has a larger coefficient of thermal expansion than the diaphragm. In another embodiment, the diaphragm is retained at its peripheral edge by a cylindrical member having low thermal mass which extends from the diaphragm holder.

A computer computes pressure in response to the relative reflected light intensities. An engine temperature sensor which is standard equipment in automotive vehicles provides an input to the computer which enables compensation for variation of the sensitivity of the diaphragm with temperature. The present sensor is also insensitive to interference caused by electromagnetic radiation which is generated at high levels by the ignition system of an internal combustion engine.

These and other features and advantages of the present invention will be apparent to those skilled in the art from the following detailed description, taken together with the accompanying drawings, in which like reference numerals refer to like parts.

DETAILED DESCRIPTION OF THE INVENTION

A fiber optic sensor 20 embodying the present invention is illustrated in FIGS. 3 to 6. The sensor 20 includes a metal body 22 which is threaded into a hole 24 which opens through a cylinder head 26 into a combustion chamber 32 of an internal combustion engine. The cylinder head 26 is bolted to a cylinder block 28 in which a piston 30 is reciprocated by combustion of an air-fuel mixture in the combustion chamber 32. A spark plug 34 is illustrated as extending into the combustion chamber 32 for igniting the air-fuel mixture therein.

Figures 6, 7:
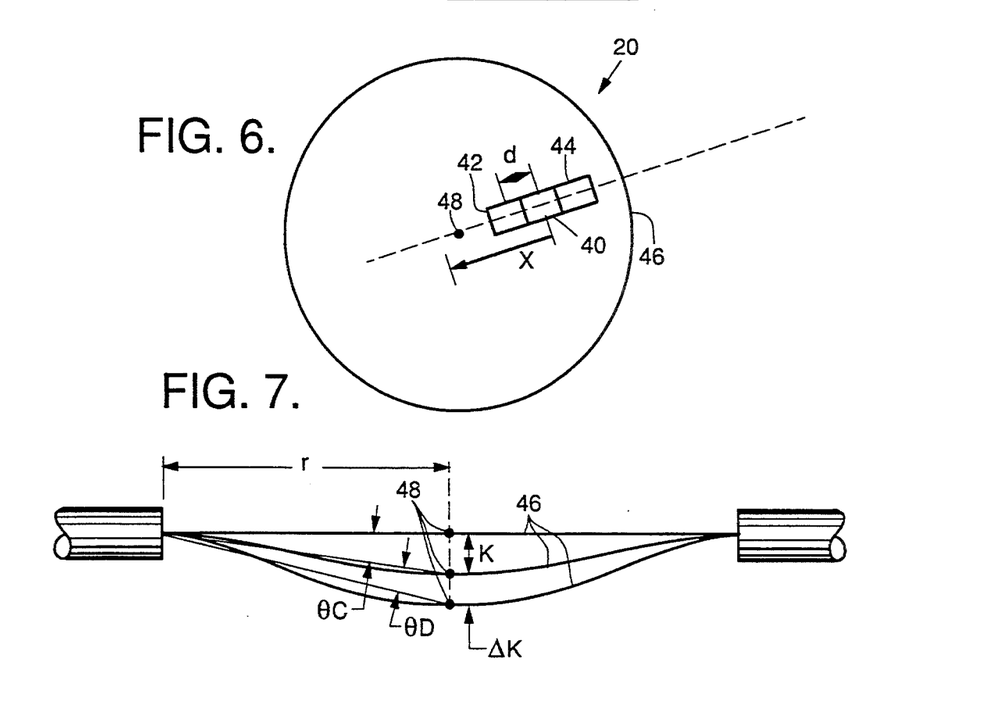
FIG. 6 is a diagram illustrating the preferred configuration of three square optical fibers of the sensor.
FIG. 7 is a diagram illustrating the relationship between the numerical apertures of the three fibers.

The sensor 20 includes first, second and third optical fibers 40, 42 and 44 which are retained by the body 22 and preferably have rectangular or square cross-sections as illustrated in FIG. 6. A diaphragm 46 in the form of a circular disc which is also retained by the body 22 has a first surface 46a which is exposed to a pressure P in the combustion chamber 21, and a second surface 46b which faces the adjacent ends of the fibers 40, 42 and 44.

The center of the first optical fiber 40 is spaced from the center 48 of the diaphragm 46 by a distance $x = r/3^{\frac{1}{2}}$ as described above. The fiber 42 is spaced radially inward from the fibers 40 and 44. The centers of the fibers 40, 42 and 44 are spaced from each other by a distance d (the width of each fiber 40, 42 and 44), such that the center of the fiber 42 is spaced by $x-d$ from the center 48, and the center of the fiber 44 is spaced by $x+d$ from the center 48.

The ends of the fibers 40, 42 and 44 which face the surface 46b of the diaphragm 46 are perpendicular to the surface 46b, and spaced therefrom by a distance y when no force or pressure is applied to the diaphragm 46 and the diaphragm 46 is flat.

Figure 5:
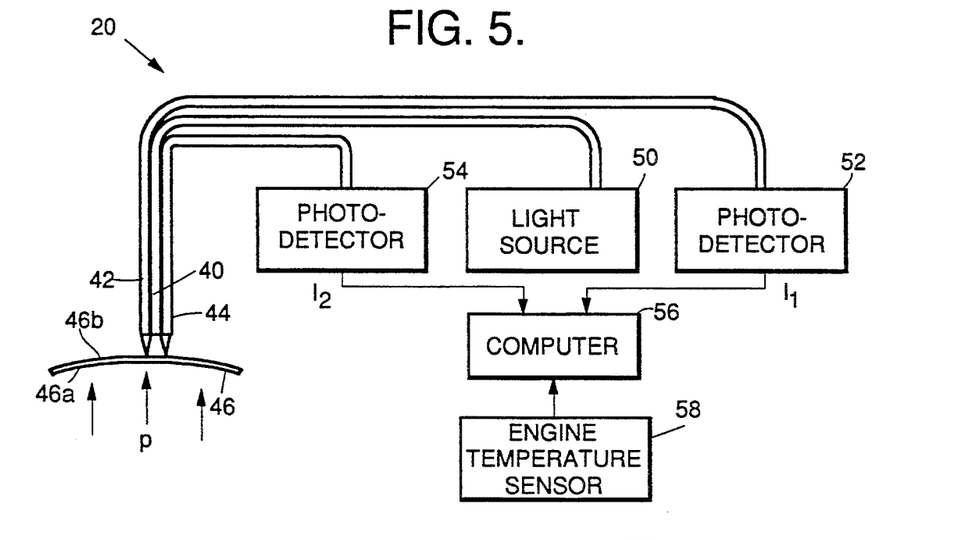
FIG. 5 is a diagram illustrating the sensor of FIGS. 3 and 4 as further including a temperature sensor and a computer.

As illustrated in FIG. 5, a light source 50 such as a light emitting diode or a laser diode injects light into the fiber 40. Light from the fiber 40 is reflected from the surface 46b of the diaphragm 46 into the fibers 42 and 44 in a relative proportion which depends on the curvature of the diaphragm 46 in the manner described above with reference to FIGS. 1a to 1c and 2.

The light from the fibers 42 and 44 is piped to photodetectors 52 and 54 respectively which produce electrical output signals (voltages or currents) having magnitudes $I_1$ and $I_2$ which correspond to the intensities $I_{IN}$ and $I_{OUT}$ respectively. The signals $I_1$ and $I_2$ are applied to a computer 56 which computes the pressure P in accordance with the relation $P = (\frac{1}{2}A)[(I_{OUT} - I_{IN})/(I_{OUT} + I_{IN})]$ or any other applicable function of $I_{IN}$ and $I_{OUT}$.

An optional engine temperature sensor 58 is further illustrated which provides a temperature input to the computer 56 as will be described below. This temperature sensor can be used to compensate for temperature variations in A at the higher temperatures.

Although $I_{OUT}$ and $I_{IN}$ may individually be sensitive to environmental perturbations such as vibration, bending of the fibers during installation and temperature changes, which can produce variations in the diameter of the fibers 40, 42 and 44, the distance y between the fibers 40, 42 and 44 and the diaphragm 46, the reflectance of the diaphragm 46 and the intensity of the input light $I_0$ from the light source 50, the expression $(I_{OUT}-I_{IN})/(I_{OUT}+I_{IN})$ is substantially insensitive to such perturbations. Since A is also substantially constant at the lower temperatures, the sensed pressure P (which depends upon $I_{OUT}$, $I_{IN}$ and A) is also substantially independent of these perturbations at the lower temperatures.

In the case in which the fibers 40, 42 and 44 have the same diameter, the distance y is selected as $y = (\frac{1}{2})r_0(k-1)/\tan\theta$ where $\theta = \sin^{-1}$(numerical aperture of the fiber 40), $r_0$ is the diameter of the core of the fiber 40, $k = r/r_0$ and r is the reflected beam radius.

If the fibers 40, 42 and 44 do not have the same diameter, the above relation must be suitably modified.

The distance y between the ends of the fibers 40, 42 and 44 and the diaphragm 46 can also be determined empirically by varying the distance y, and determining the value at which the maximum response to pressure variation is detected by the sensor 20.

In accordance with the invention, the optical fibers 40, 42 and 44 and light source 50 are designed such that substantially all optical modes of the fiber 40 are fully populated (mode scrambled). This substantially reduces the sensitivity of the sensor 20 to optical modal noise caused by physical perturbation of the fiber 40 resulting from variation of the optical mode distribution in the fiber 40 which is a problem in the prior art as discussed above. Techniques for fully populating the optical modes of an optical fiber are well known in the art per se.

The optical noise in the fibers 40, 42 and 44 is further reduced in accordance with the invention by making the numerical aperture of the second and third fibers 42 and 44 larger than the numerical aperture of the first fiber 40. This increases the optical coupling between the fibers 40, 42 and 44, ensures that the reflected light propagating through the fibers 42 and 44 will not suffer any loss other than Fresnel reflection, and prevents distortion caused by optical signal loss. The numerical apertures of the fibers 42 and 44 are preferably the same, but can be different within the scope of the invention.

More specifically, if the fibers 42 and 44 had the same numerical aperture as the first fiber 40 in the manner disclosed by Tekippe, it would be necessary to make the optical modes of the first fiber 40 less than fully populated in order to narrow the beam divergence and ensure that all reflected light enters the second and third fibers 44 and 46. This would increase the sensitivity of the sensor to physical perturbation and result in a change in the profile of the spot projected from the fiber 40 onto the diaphragm 46 which cannot be distinguished from the applied pressure.

This sensitivity is reduced to a negligible extent by fully populating the optical modes in the fiber 40. This, however, increases the maximum angle at which the beam is projected from the fiber 40 onto the diaphragm 46. If the numerical aperture of the fibers 42 and 44 were not increased, the angle at which the reflected light entered the fibers 42 and 44 with applied pressure could exceed the critical angle thereof, resulting in radiation loss through the fibers 42 and 44 and a non-linear response to pressure.

The numerical aperture of the fibers 42 and 44 is therefore made sufficiently larger than that of the fiber 40 to not merely to ensure that all reflected light is captured by the fibers 42 and 44, but also to ensure that the reflected light enters the fibers 42 and 44 at an angle that the critical angle will not be exceeded under all circumstances and the light Will be strongly guided through the fibers 42 and 44. This positively precludes radiation loss through the fibers 42 and 44 and accompanying nonlinearity and noises.

The numerical apertures of the fibers 40, 42 and 44 are preferably selected in accordance with the following relations as shown in FIG. 7, in which the flexing of diaphragm 46 is exaggerated for purposes of illustration.

$\theta A \geq \theta B + \theta C + \theta D + \theta E$, where $\theta A$ is the numerical aperture of the fibers 42 and 44;

$\theta B$ is the numerical aperture of the fiber 40;

$\theta C = \tan^{-}(K/r)$ is a predetermined maximum curvature tolerance of the diaphragm 46 in the absence of applied force;

$\theta D = \tan^{-1}(\Delta K/r)$ is a predetermined curvature of the diaphragm in response to a predetermined maximum applied force;

$\theta E$ is a predetermined maximum induced divergence of light propagating through the fiber 40 in response to physical perturbation thereof;

r is the radius of the diaphragm;

K is the displacement of the center of the diaphragm in the absence of applied force at the predetermined maximum curvature tolerance;

$r >> K$;

$\Delta K$ is the displacement of the center of the diaphragm in response to the predetermined maximum applied force; and $r >> K + \Delta K$ The fibers 40, 42 and 44 can have the same or different physical cross-sectional areas as long as the numerical aperture of the fibers 42 and 44 is larger than that of the fiber 40 as expressed above. Preferably, the cross-section of the fiber 40 is made as small as possible for maximizing linearity by constraining the beam to a substantially linear area of the diaphragm 46, but not so small that the efficiency by which light is coupled into the fiber is insufficient. The cross-section of the fibers 42 and 44 is made as large as possible to maximize the light collection efficiency. For ease of packaging, the fibers 40, 42 and 44 have the same diameter.

The fibers 40, 42 and 44 can be made of any suitable commercially available material such as glass, fused silica or sapphire. Regardless of the configuration of the fibers 40, 42 and 44, the cladding thickness thereof is made as small as possible to minimize dead space between the fibers 40, 42 and 44.

Figure 8:
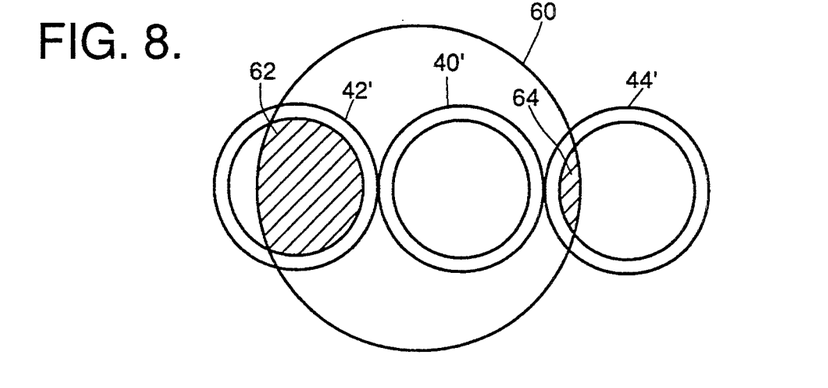
FIG. 8 is a diagram illustrating the non-linearity inherent in a sensor including three round optical fibers.

Although the scope of the invention includes configuring the fibers 40, 42 and 44 with circular cross-sections, the cross-sections of the fibers 40, 42 and 44 are preferably rectangular or square. The reason for this is illustrated in FIG. 8. Optical fibers 40', 42' and 44' correspond to the fibers 40, 42 and 44 respectively but have circular cross-sections. The light beam from the fiber 40' which is reflected from the diaphragm 46 onto the fibers 42' and 44' is subjected to divergence in the air gap therebetween and is designated as 60.

The center of the beam 60 is illustrated as being deflected leftwardly from the center of the fiber 40' due to a negative pressure P in accordance with the principles described above with reference to FIG. 2. The light beams subtend areas 62 and 64 of the ends of the fibers 42' and 44' respectively as indicated by hatching. The areas 62 and 64 vary non-linearly in response to displacement of the beam 60 along a line joining the centers of the fibers 40', 42' and 44'.

Figure 10:
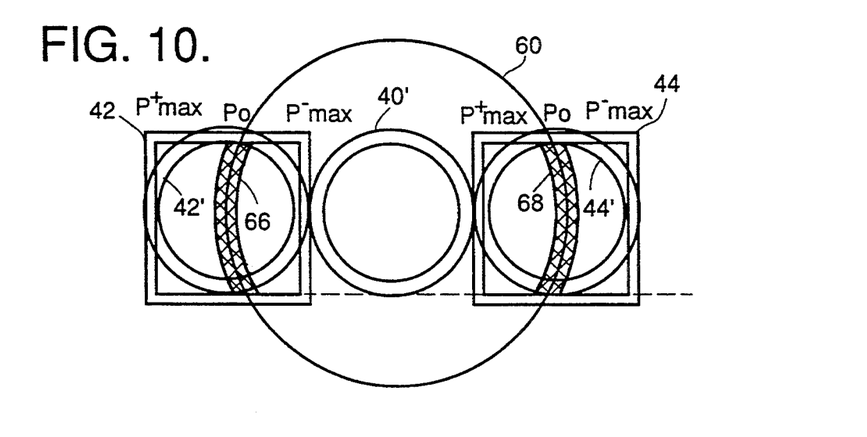
FIG. 10 is a diagram illustrating an alternative arrangement including two square optical fibers and one round optical fiber.

As further illustrated in FIG. 10, the response of a sensor including the three circular fibers 40', 42, and 44' is acceptably linear only with a predetermined range indicated by hatched areas 66 and 68. At zero pressure $P_0$, the edge of the beam 60 intersects the peripheral edges of the fibers 42' and 44' along diameters which are perpendicular to the line joining the centers of the fibers 40', 42' and 44'. The acceptable sizes of the areas 66 and 68 for pressures between a maximum negative value $P-$max and a maximum positive value $P+$max are relatively small as illustrated.

Figure 9:
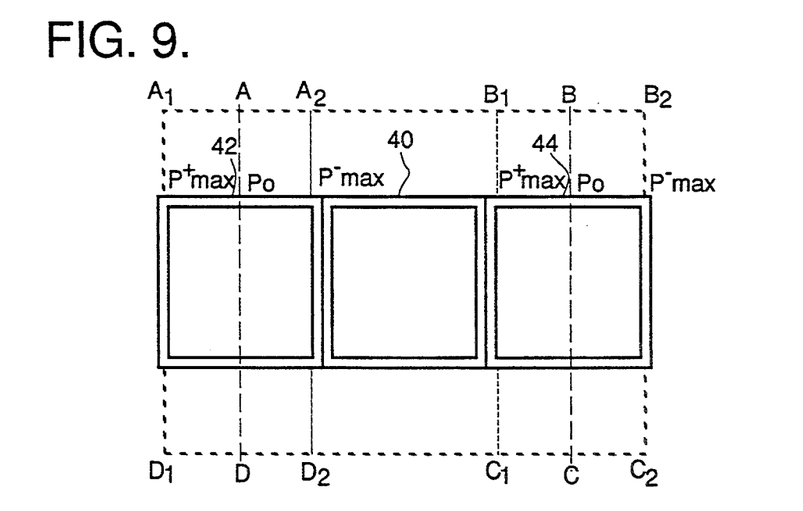
FIG. 9 is a diagram illustrating an arrangement of three square optical fibers which produces maximum linearity in accordance with the invention.

The preferred embodiment of the invention as utilizing rectangular or square fibers 40, 42 and 44 to overcome the drawback described with reference to FIG. 8 is illustrated in FIG. 9. The geometry of the sensor 20 is selected such that the vertical edges of a beam ABCD reflected back on the fibers 42 and 44 from the diaphragm 46 will pass through the centers of the fibers 42 and 44 as indicated at AD and BC respectively at zero pressure $P_0$.

The vertical edges of a beam $A_1B_1C_1D_1$ for maximum positive pressure $P+$max pass through the left edges of the fibers 42 and 44 as indicated at $A_1D_1$ and $B_1C_1$, whereas the vertical edges of a beam $A_2B_2C_2D_2$ for maximum positive pressure $P+$max pass through the right edges of the fibers 42 and 44 as indicated at $A_2D_2$ and $B_2C_2$.

In this manner, the areas of the fibers 42 and 44 which are subtended by the light beam from the fiber 40 vary linearly for all values of pressure P between $P+$max and $P-$max. The sensor 20 therefore has a theoretically perfect linear response to pressure variation and maximum dynamic range.

Further illustrated in FIG. 10 is an arrangement including the square fibers 42 and 44 and the circular fiber 40'. The linearity of this configuration is slightly less than that of FIG. 9. Although not illustrated, it is also within the scope of the invention to utilize circular optical fibers in combination with rectangular or square masks.

Figure 3:
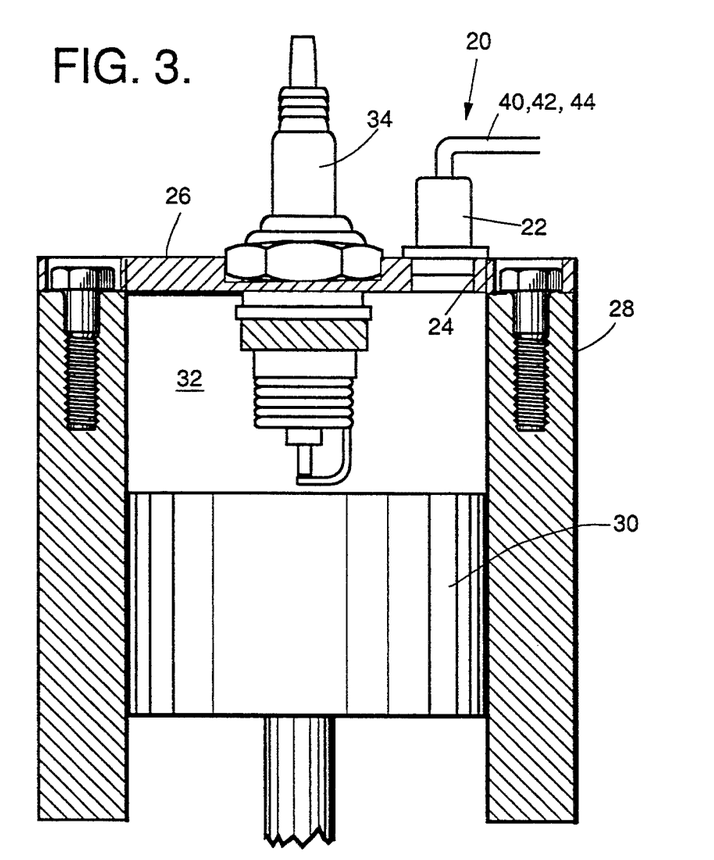
FIG. 3 is a vertical section illustrating a pressure sensor embodying the present invention as intruding into the combustion chamber of an internal combustion engine.
Figure 4:
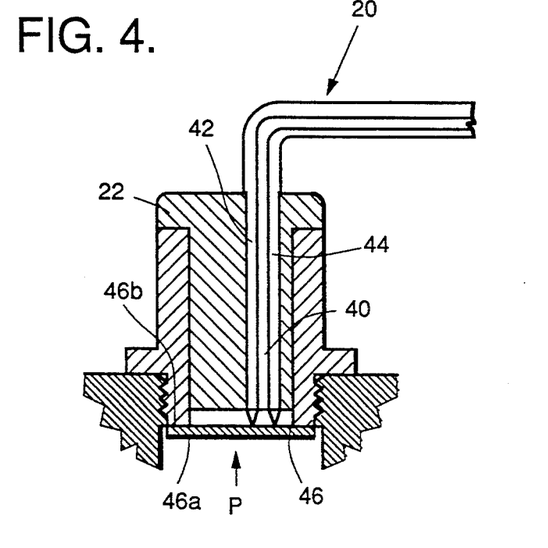
FIG. 4 illustrates the sensor of FIG. 3 to enlarged scale.
Figure 11:
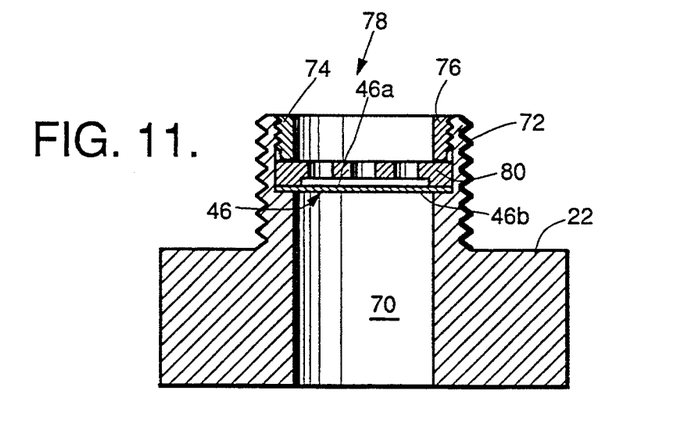
FIG. 11 is a vertical section illustrating a diaphragm assembly which inhibits thermally induced curvature of the diaphragm.
Figure 12:
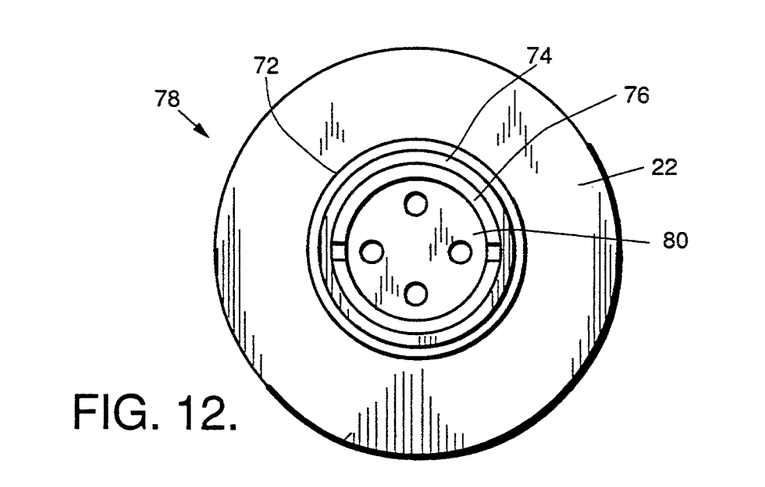
FIG. 12 is a plan view illustrating the assembly of FIG. 11.

FIGS. 11 and 12 illustrate a portion of the sensor 20 including the body 22 and the diaphragm 46. The body 22 is formed with a central bore 70 and a threaded, reduced diameter portion 72 which screws into the hole 24 in the cylinder head 26 as illustrated in FIG. 3.

The bore 70 has an enlarged, internally threaded portion 74. The peripheral edge of the diaphragm 46 is clamped between a step defined at the bottom of the portion 74 and an annular setscrew 76 which screws into the portion 74. The optical fibers 40, 42 and 44 are not illustrated in FIG. 11, but intrude into the bore 70 such that their ends are adjacent to the surface 46b of the diaphragm 46. The surface 46a of the diaphragm 46 is exposed to the pressure in the combustion chamber 32.

The body 22 and the setscrew 76 constitute a diaphragm holder 78 which has a much larger thermal mass than the diaphragm 46. Since the diaphragm holder 78 is connected to the engine block, which is cooled and constitutes a heat sink, the temperature of the diaphragm 46, which is exposed directly to the combustion gas, will be significantly higher than the temperature of the diaphragm holder 78.

If the diaphragm and diaphragm holder are made of the same material, which is usually the case, this temperature differential will cause the diaphragm and diaphragm holder to expand at different rates. In a simple arrangement such as disclosed by Tekippe, this will cause the curvature of the diaphragm to vary in response to changes in temperature, even if the applied pressure does not change. This thermally induced curvature varies with temperature, and causes zero level drift in the sensed pressure.

This problem is solved in accordance with the present invention by suitable selection of the materials of the diaphragm 46 and the diaphragm holder 78. More specifically, the coefficient of thermal expansion of the diaphragm holder 78 is made larger than that of the diaphragm 46 by an amount which is selected in accordance with the anticipated operating temperature and temperature difference between the diaphragm 46 and the diaphragm holder 78.

Due to the complexity of the variables involved, the design is preferably determined empirically. With proper selection, the diaphragm 46 will be flat at zero pressure, and the curvature of the diaphragm 46 will not change in response to temperature variation over the anticipated operating temperature range of the sensor 20.

By way of example, a suitable material for the diaphragm 46 is Inconel alloy 718 which has a thermal expansion coefficient of approximately $13 \times 10^{-6}/°C.$, and a high yield strength of greater than 130,000 psi at 700° C. A suitable material for the diaphragm holder 78 which is matched to the diaphragm material is series 300 stainless steel, having a thermal expansion coefficient of approximately $17 \times 10^{-6}/°C.$ The temperature of the diaphragm 46 can be reduced, and the temperature difference between the diaphragm 46 and the diaphragm holder 78 correspondingly reduced, by providing a perforated heat shield 80 in front of the surface 46a of the diaphragm 46. The heat shield 80 is made of copper or other high temperature and high thermal conductivity material which will not adversely adverse the pressure response of the diaphragm 46. The heat conduction between the diaphragm 46 and the diaphragm holder 78 can be improved by providing copper cladding on at least one of these elements.

Figure 13:
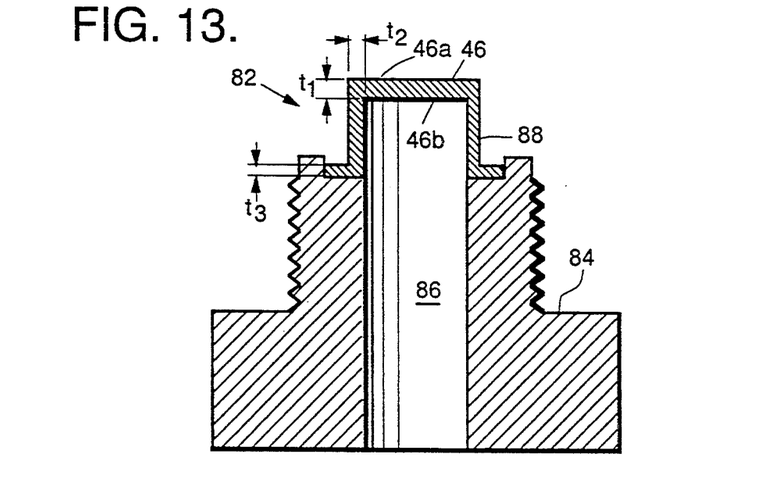
FIGS. 13, 14 and 15 are vertical sections illustrating alternative diaphragm assemblies.

FIG. 13 illustrates another arrangement for inhibiting thermally induced curvature of the diaphragm 46. A diaphragm holder 82 includes a sensor body 84 which is formed with a central bore 86, and a hollow, cylindrical member 88 which is attached at its lower end to the body 84 and at its upper end to the periphery of the diaphragm 46. The member 88 has small thermal and mechanical mass and serves to insulate the diaphragm 46 from the diaphragm holder 82 and reduce the thermal expansion differential which causes thermally induced curvature.

In FIG. 13, $t_1 \leq t_2 < t_3$, where $t_1$ is the thickness of the diaphragm 46, $t_2$ is the thickness of the cylindrical member 88 and $t_3$ is the thickness of a flange portion of the cylindrical member 88 which is welded to the body 84.

Figure 14:
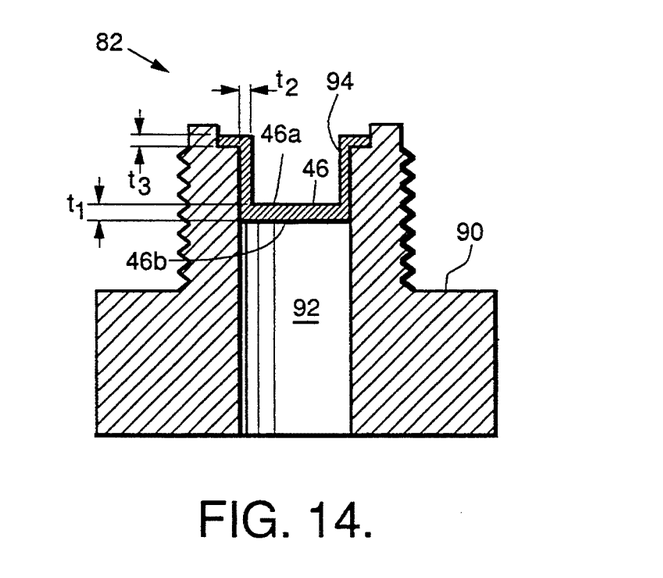

The cylindrical member 88 of FIG. 13 protrudes external of the end of the sensor body 84. FIG. 14 illustrates an alternative arrangement including a sensor body 90 which is formed with a central bore 92, and a hollow cylindrical member 94 which intrudes into the bore 92. This arrangement enables the threaded portion of the body 90 which screws into the hole 24 to be made longer, thereby increasing the efficiency by which the body 90 acts as a heat sink for the diaphragm 46. The relationship $t_1 \leq t_2 < t_3$ is also applicable to the embodiment of FIG. 14.

Figure 15:
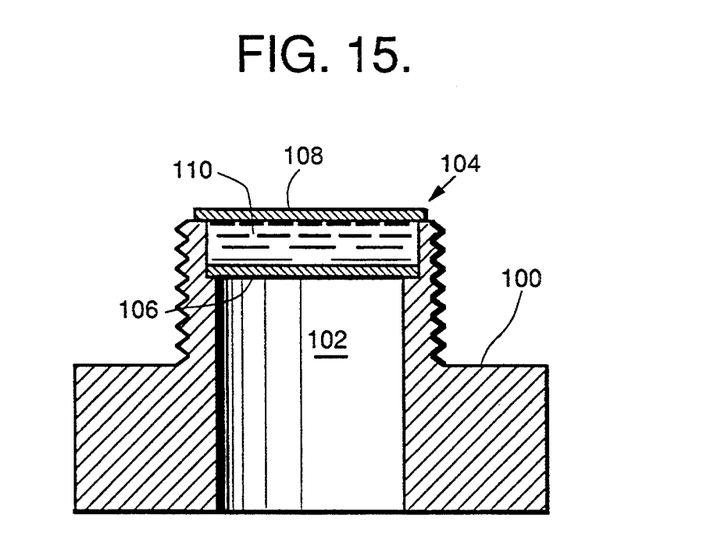

FIG. 15 illustrates another arrangement for inhibiting thermally induced diaphragm curvature. A sensor body 100 which acts as a diaphragm holder is formed with a central bore 102. A diaphragm 104 includes a relatively hard main disc 106 which is retained at a step in the bore 102, a relatively soft secondary disc 108 which is sealingly attached to the upper end of the body 100, and a fluid 110 which fills the space between the discs 106 and 108.

The pressure, and also the heat in the combustion chamber 32, are transmitted to the main disc 106 by the secondary disc 108 and the fluid 110. The fluid 110 is a synthetic oil or other material which has a high boiling point and low thermal conductivity and low compressivity. The disc 108 and fluid 110 thermally shield the disc 106, whose curvature is sensed for pressure measurement, from the heat in the combustion chamber 32 and thereby inhibit thermally induced curvature thereof. The secondary disc 108 is soft enough that it does not substantially affect the pressure which is transmitted by the disc 108 and fluid 110 to the main disc 106.

Figure 16:
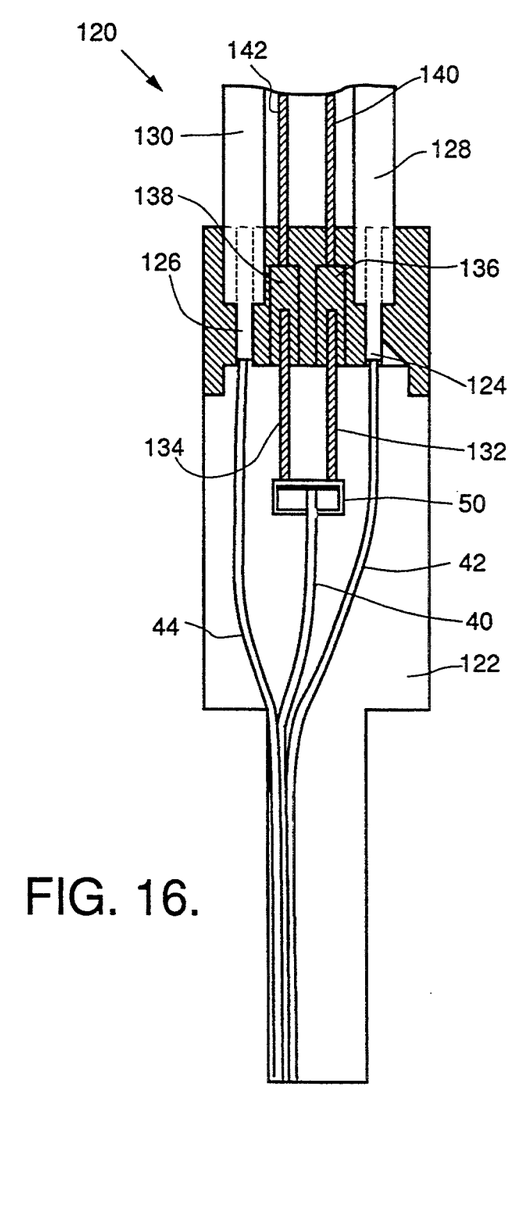
FIG. 16 is a sectional view of a sensor head incorporating a light emitting diode and electrical and optical connectors.

FIG. 16 illustrates a sensor head assembly 120 which provides an improved level of insensitivity to physical perturbation of the center optical fiber 40 and minimize the optical loss if a connector is used between the cable and sensor head.

The assembly 120 includes a hollow sensor body or probe 122 made of thermally resistant ceramic, metal, plastic or resin or the like. The optical fibers 40, 42 and 44 extend upwardly through the probe 122 from the lower end thereof as shown and are retained in the probe 122 by ceramic cement (not shown).

The fibers 42 and 44 terminate at their upper ends in optical connectors 124 and 126, and are connected to the photodetectors 52 and 54 of FIG. 5 through optical fibers 128 and 130 of large diameter and large numerical aperture which plug into the connectors 124 and 126 respectively.

The light source 50 is constituted by a light emitting diode or laser diode which is retained in the probe 122 by an electrically and thermally insulative ceramic cement, and is connected to inject light into the upper end of the fiber 40. The light source 50 is powered through electrical leads 132 and 134 which terminate in electrical connectors 136 and 138 respectively. Electrical leads 140 and 142 plug into the connectors 136 and 138 respectively and are connected to an appropriate electrical power source (not shown).

The assembly 120 is provided with adequate thermal insulation (not shown) to maintain it below the cooling water temperature of the engine block and thereby below the maximum operating temperature of the light source 50, which is typically 130° C. for a light emitting diode. Any electrical interference on the electrical leads 140 and 142 has negligible effect on the optical pressure signal propagating through the optical fibers 128 and 130 with the photodetectors 52 and 54 located remotely from the engine block.

The optical pressure signal propagating through the fibers 128 and 130 is only sensitive to power loss therein, and is not affected by optical mode distribution profile change. The optical power loss in the fibers 128 and 130, even under severe operating conditions, is minimal due to their large numerical aperture.

Whereas the optical fibers 40, 42 and 44 are preferably made of high quality optical glass in order to provide the required high temperature environment, the fibers 128 and 132 can be made of low cost plastic due to their large numerical aperture. This enables the assembly 120 to be manufactured at low cost on a commercial production basis.

As described above, the pressure P can be computed by the computer 56 as a function of the intensities $I_{IN}$ and $I_{OUT}$ of light propagating through the outer optical fibers 42 and 44 to the photodetectors as $P=(\frac{1}{A})[I_{OUT}-I_{IN})/(I_{OUT}+I_{IN})]$ when the diaphragm 46 is maintained at low temperature since the value of A is substantially constant.

However, at elevated temperatures on the order of 700° C. which are typically encountered in the combustion chamber of an internal combustion engine, the value of A is not constant, but varies as a function of temperature. This, in addition to the temperature difference $\Delta T$ between the diaphragm and the diaphragm holder, creates zero drift in the computed value of pressure P and thereby inaccuracy in the operation of the sensor.

Under high temperature conditions, the ratio $(I_{OUT}-I_{IN})/(I_{OUT}+I_{IN})=AP+B\Delta T$, where B is an empirically derived constant. Since $\Delta T$ varies very slowly relative to P, this relation can be derived as follows $P=(1/A)\{A.C. \text{ component of } (I_1-I_2)/(I_1+I_2)\}$; and
$\Delta T=(1/B)(D.C. \text{ component of } (I_1-I_2)/(I_1+I_2)\}$ The A.C. and D.C. components of $(I_{OUT}-I_{IN})/(I_{OUT}+I_{IN})$ can be separated by bandpass filters in a conventional manner.

The value of A varies as a function of temperature, and can be expressed as $$A = \frac{Cr^3(1-\mu^2)}{3.45 n_1 Y t^3} \tan\theta_c$$

where C is a constant which depends on the optical fiber configuration, r is the radius of the diaphragm, $\mu$ is the Poisson's ratio of the diaphragm, $n_1$ is the index of refraction of the cores of the optical fibers, Y is the Young's modulus of the diaphragm, t is the thickness of the diaphragm and $\theta_c$ is the critical angle of the fiber 40 as described above.

The Poisson's ratio $\mu$ and Young's modulus Y vary with temperature as $\mu=0.3-1.2\times 10^{-4}T+1.1\times 10^{-7}T^2+7.6\times 10^{-11}T^3$
and
$y=2.9\times 10^7-1.1\times 10^4T+11.9T^2-1.3\times 10^{-2}T^3$ where T is the temperature of the d equal to $T=T_e+\Delta T$, and $T_e$ is the temperature of the engine block and thereby the diaphragm holder 78 as measured by the sensor 58. The temperatures are expressed in degrees Centigrade whereas the pressures are expressed in pounds per square inch.

The engine temperature sensor which is conventionally provided for an internal combustion engine can bifunction as the sensor 58, thereby eliminating the need for a separate temperature sensor.

This arrangement enables the computer 50 to compute the pressure as a predetermined function of $I_{IN}$, $I_{OUT}$ and temperature with a high degree of accuracy, even at high temperatures at which the sensitivity of the diaphragm varies significantly with temperature.

EXAMPLE

A sensor 20 embodying the present invention was constructed and tested on an LT-1 Corvette engine under motoring conditions at 130° C. (no combustion), and firing conditions at over 700° C. (full combustion). The sensitivity and linearity were comparable to those of an instrumentation grade acoustic sensor without significant thermal effects.

The sensor 20 included a center fiber 40 having a circular cross-section made of silica with a core diameter of 200 micrometers, a cladding outer diameter of 250 micrometers and a numerical aperture of 0.22. The outer fibers 42 and 44 also had circular cross-sections, a core diameter of 200 micrometers, a cladding outer diameter of 250 micrometers and a numerical aperture of 0.56. The diaphragm 46 was made of 400 series stainless steel, and the diaphragm holder 78 was made of 300 series stainless steel.

The sensor 20 was calibrated, and shipped to a remote location for testing without recalibration. The sensor 20 operated accurately with a few percent of zero drift, with the sensitivity and linearity substantially unchanged. The physical perturbation induced noise was approximately two orders of magnitude smaller than a similarly constructed sensor including three optical fibers having the same numerical aperture.

While several illustrative embodiments of the invention have been shown and described, numerous variations and alternate embodiments will occur to those skilled in the art, without departing from the spirit and scope of the invention.

For example, although the present sensor has been described as being especially suitable for a high temperature application such as sensing the pressure in the combustion chamber of an internal combustion engine, the present sensor and diaphragm assembly can be advantageously employed in any application in which the curvature of a disc or other object is to be sensed. The present sensor can be used to provide either absolute or relative pressure readings in a variety of environments.

Although specifically designed for use in a curvature sensor, the principles of the invention can also be applied to a deflection sensor. As another modification, the sensor head can be designed to extend into a combustion chamber through a hole in a spark plug, in contrast to the arrangement of FIG. 3 in which two separate holes are required for the spark plug and the sensor head.

Accordingly, it is intended that the present invention not be limited solely to the specifically described illustrative embodiments. Various modifications are contemplated and can be made without departing from the spirit and scope of the invention as defined by the appended claims.

I claim:

1. A sensor for sensing curvature of a disc, the sensor having a low sensitivity to physical perturbations and comprising:
    a first optical fiber for transmitting light to the disc;
    a second optical fiber disposed on a side of the first optical fiber for receiving light from the first optical fiber after reflection from the disc; and
    a third optical fiber disposed on an opposite side of the first optical fiber for receiving light from the first optical fiber after reflection from the disc;
    the second and third optical fibers having numerical apertures which are larger than the numerical aperture of the first optical fiber to reduce light loss through the walls of the second and third optical fibers due to physical perturbations of the fibers.

2. A sensor as in claim 1, in which the first, second and third optical fibers are disposed along a radius of the disc with the center of the first optical fiber being spaced from the center of the disc by a predetermined distance.

3. A sensor as in claim 2, in which $x = r/3^{\frac{1}{2}}$, where x is said predetermined distance and r is the radius of the disc.

4. A sensor as in claim 2, in which the first, second and third optical fibers have end portions which extend parallel to each other and terminate in ends which are spaced from the disc by a predetermined distance.

5. A sensor as in claim 1, in which:
    $\theta A \geq \theta B + \theta C + \theta D + \theta E$
    $\theta A$ is said numerical aperture of the second and third optical fibers;
    $\theta B$ is said numerical aperture of the first optical fiber;
    $\theta C$ is a predetermined maximum curvature of the disc in the absence of applied force;
    $\theta D$ is a predetermined curvature of the disc in response to a predetermined maximum applied force; and
    $\theta E$ is a predetermined maximum induced divergence of light propagating through the first optical fiber in response to physical perturbation thereof.

6. A sensor as in claim 1, further comprising a light source for injecting light into the first optical fiber such that substantially all optical modes of the first optical fiber are fully populated.

7. A sensor as in claim 1, in which the second and third optical fibers have rectangular cross-sections.

8. A sensor as in claim 7, in which the first optical fiber has a rectangular cross-section.

9. A sensor as in claim 7, in which the first optical fiber has a circular cross-section.

10. A sensor as in claim 1, in which the first, second and third optical fibers are disposed relative to the disc such that light from the first optical fiber is reflected by the disc onto the second and third optical fibers such that edges of said reflected light pass substantially through centers of the second and third optical fibers respectively in the absence of force applied to the disc.

11. A sensor as in claim 1, in which the disc comprises a diaphragm having a first surface which faces the first, second and third optical fibers and a second surface which is exposed to pressure which is to be sensed.

12. A sensor as in claim 11, further comprising:
    a first photodetector for receiving light transmitted thereto from the second optical fiber and producing a first electrical signal corresponding thereto;
    a second photodetector for receiving light transmitted thereto from the third optical fiber and producing a second electrical signal corresponding thereto; and
    a computer for computing said curvature of the disc as a predetermined function of said first and second electrical signals.

13. A sensor for sensing pressure of a high temperature gas, comprising:

a diaphragm having a first surface which is exposed to said high temperature gas and a second surface;

a first optical fiber for transmitting light to said second surface of the diaphragm;

a second optical fiber disposed on a side of the second optical fiber for receiving light from the first optical fiber after reflection from said second surface of the diaphragm;

a third optical fiber disposed on an opposite side of the first optical fiber for receiving light from the first optical fiber after reflection from said second surface of the diaphragm; and structure for inhibiting temperature induced curvature of the diaphragm.

14. A sensor as in claim 13, in which said structure comprises a diaphragm holder for retaining the diaphragm at its peripheral edge, the diaphragm holder having a larger coefficient of thermal expansion than the diaphragm.

15. A sensor as in claim 13, in which said structure comprises:

a diaphragm holder; and a hollow cylindrical member having a first end attached to the diaphragm holder and a second end attached to the peripheral edge of the diaphragm.

16. A sensor as in claim 15, in which the cylindrical member extends externally from the diaphragm holder.

17. A sensor as in claim 15, in which:

the diaphragm holder has a bore; and the cylindrical member extends into said bore of the diaphragm holder.

18. A sensor as in claim 13, in which said structure comprises a perforated heat shield disposed adjacent to said first surface of the diaphragm.

19. A diaphragm assembly for sensing pressure of a high temperature gas, comprising:

a diaphragm having a first surface which is exposed to said high temperature gas, the curvature of the diaphragm changing in response to said pressure;

structure for inhibiting temperature induced curvature of the diaphragm, in which said structure comprises a diaphragm holder for retaining the diaphragm at its peripheral edge, the diaphragm holder having a larger coefficient of thermal expansion than the diaphragm.

20. A diaphragm assembly an in claim 19, in which said structure further comprises a perforated heat shield disposed adjacent to said first surface of the diaphragm.

21. A diaphragm assembly as in claim 19, in which:

the diaphragm further comprises two discs which are separated by a space; and said structure further comprises a fluid disposed in said space.

22. A diaphragm assembly for sensing pressure of a high temperature gas, comprising:

a diaphragm having a first surface which is exposed to said high temperature gas, the curvature of the diaphragm changing in response to said pressure; and structure for inhibiting temperature induced curvature of the diaphragm; and in which said structure comprises:

a diaphragm holder; and a hollow cylindrical member having a first end attached to the diaphragm holder and a second end attached to the peripheral edge of the diaphragm.

23. A diaphragm assembly as in claim 22, in which the cylindrical member extends externally from the diaphragm holder.

24. A diaphragm assembly as in claim 22, in which:

the diaphragm holder has a bore; and the cylindrical member extends into said bore of the diaphragm holder.

25. A diaphragm assembly an in claim 22, in which said structure further comprises a perforated heat shield disposed adjacent to said first surface of the diaphragm.

26. A diaphragm assembly as in claim 22, in which:

the diaphragm further comprises two discs which are separated by a space; and said structure further comprises a fluid disposed in said space.

27. A diaphragm assembly for sensing pressure of a high temperature gas, comprising:

a diaphragm having a first surface which is exposed to said high temperature gas, the curvature of the diaphragm changing in response to said pressure; and structure for inhibiting temperature induced curvature of the diaphragm, in which said structure comprises a perforated heat shield disposed adjacent to said first surface of the diaphragm.

28. A diaphragm assembly for sensing pressure of a high temperature gas, comprising:

a diaphragm having a first surface which is exposed to said high temperature gas, the curvature of the diaphragm changing in response to said pressure; and structure for inhibiting temperature induced curvature of the diaphragm;

in which:

the diaphragm comprises two discs which are separated by a space; and said structure comprises a fluid disposed in said space.

29. A pressure sensor for sensing pressure of a high temperature gas, comprising:

a diaphragm having a first surface which is exposed to said high temperature gas and a second surface;

a diaphragm holder for retaining the diaphragm at its peripheral edge;

a first optical fiber for transmitting light to said second surface of the diaphragm;

a second optical fiber disposed on a side of the second optical fiber for receiving light from the first optical fiber after reflection from said second surface of the diaphragm;

a third optical fiber disposed on an opposite side of the first optical fiber for receiving light from the first optical fiber after reflection from said second surface of the diaphragm;

a first photodetector for receiving light transmitted thereto from the second optical fiber and producing a first electrical signal corresponding thereto;

a second photodetector for receiving light transmitted thereto from the third optical fiber and producing a second electrical signal corresponding thereto;

a temperature sensor for sensing the temperature of the diaphragm holder and producing a third electrical signal corresponding thereto; and a computer for computing the value of a predetermined thermal characteristic of the diaphragm which varies in response to temperature as a predetermined function of said first, second and third electrical signals.

30. A pressure sensor as in claim 29, in which:
the first, second and third optical fibers are disposed along a radius of the diaphragm with the center of the first optical fiber being spaced from the center of the diaphragm by a predetermined distance; and
$(I_1 - I_2)/(I_1 + I_2) = AP + \Delta T$, where
$I_1$ is the magnitude of said first electrical signal;
$I_2$ is the magnitude of said second electrical signal;
A is said thermal characteristic of the diaphragm;
B is a constant;
$\Delta T$ is the temperature difference between the diaphragm and the diaphragm holder;
$P = (1/A)\{\text{A.C. component of } (I_1 - I_2)/(I_1 + I_2)\}$; and
$\Delta T = (1/B)\{\text{D.C. component of } (I_1 - I_2)/(I_1 + I_2)\}$.

31. An optical sensor head, comprising:
a body;
a first optical fiber retained by the body;
second and third optical fibers retained by the body on opposite sides of the first optical fiber respectively;
a light source retained by the body for injecting light into an end of the first optical fiber;
an electrical connector which is retained by the body and connected to the light source; and
first and second optical connectors which are retained by the body and connected to ends of the second and third optical fibers respectively.

32. An optical sensor head as in claim 31, in which the light source comprises a light-emitting diode.

* * * * *